United States Patent
Porco (10) Patent No.: US 9,896,069 B2
(45) Date of Patent: Feb. 20, 2018

(54) VARIABLE RATIO MECHANISM FOR ADJUSTABLE PEDALS TO MAINTAIN A CONSTANT RATIO

(71) Applicant: VENTRA GROUP CO., Halifax, Nova Scotia (CA)

(72) Inventor: Nick Porco, Maple (CA)

(73) Assignee: VENTRA GROUP, CO., Halifax, Nova Scotia (CA)

( * ) Notice: Subject to any disclaimer, the term of this patent is extended or adjusted under 35 U.S.C. 154(b) by 183 days.

(21) Appl. No.: 14/880,719

(22) Filed: Oct. 12, 2015

(65) Prior Publication Data
US 2016/0107621 A1 Apr. 21, 2016

Related U.S. Application Data

(60) Provisional application No. 62/064,360, filed on Oct. 15, 2014.

(51) Int. Cl.
| | |
|---|---|
| *G05G 1/40* | (2008.04) |
| *B60T 7/06* | (2006.01) |
| *G05G 1/405* | (2008.04) |
| *G05G 1/30* | (2008.04) |

(52) U.S. Cl.
CPC .............. *B60T 7/06* (2013.01); *G05G 1/30* (2013.01); *G05G 1/40* (2013.01); *G05G 1/405* (2013.01)

(58) Field of Classification Search
CPC . G05G 1/40; G05G 1/405; G05G 1/30; B60T 7/06
See application file for complete search history.

(56) References Cited

U.S. PATENT DOCUMENTS

| | | | |
|---|---|---|---|
| 3,646,831 | A | 3/1972 | Janosi |
| 3,678,779 | A | 7/1972 | Janosi |
| 3,858,457 | A | 1/1975 | Mathues |
| 3,911,760 | A | 10/1975 | Elbers et al. |
| 3,988,945 | A | 11/1976 | Fasano |
| 4,069,722 | A | 1/1978 | Derrick |

(Continued)

FOREIGN PATENT DOCUMENTS

| | | |
|---|---|---|
| EP | 1 552 995 | 7/2005 |
| WO | WO 02/055353 | 7/2002 |

OTHER PUBLICATIONS

International Search Report and Written Opinion dated Dec. 24, 2015 for Appln. No. PCT/IB2015/057805.

(Continued)

*Primary Examiner* — Thomas C Diaz
(74) *Attorney, Agent, or Firm* — Pillsbury Winthrop Shaw Pittman, LLP (57) ABSTRACT

Provided herein is an adjustable pedal assembly for a vehicle for operating a push rod of a brake system, for example. The assembly includes an activation link connected via a pivot member to an elongated lever structure of the pedal arm, a link member for connection to the push rod to activate the brake system that is operatively connected to the activation link, and an adjustable slide pin for moving a pivot axis of the elongated lever structure between a first pivot position and a second pivot position. The pedal arm and pedal plate are thus moved between a first position and a second position, while maintaining a substantially constant ratio between each of the positions.

39 Claims, 6 Drawing Sheets

(56) References Cited

U.S. PATENT DOCUMENTS

| | | | |
|---|---|---|---|
| 4,386,537 | A | 6/1983 | Lewis |
| 4,615,235 | A | 10/1986 | Horvath |
| 4,875,385 | A | 10/1989 | Sitrin |
| 5,010,782 | A | 4/1991 | Asano et al. |
| 5,086,663 | A * | 2/1992 | Asano ................... B60T 7/06 74/512 |
| 5,890,399 | A | 4/1999 | Rixon et al. |
| 6,571,660 | B2 | 6/2003 | Gmurowski et al. |
| 6,584,871 | B2 | 7/2003 | Burton et al. |
| 6,782,776 | B2 | 8/2004 | Oberheide et al. |
| 6,952,980 | B2 | 10/2005 | Hayashihara et al. |
| 7,014,022 | B2 | 3/2006 | Sauvonnet et al. |
| 7,051,613 | B2 | 5/2006 | Burton et al. |
| 7,219,576 | B2 * | 5/2007 | Leonard ................... B60T 7/06 74/512 |
| 2001/0047695 | A1 | 12/2001 | Ichiba |
| 2002/0002874 | A1 | 1/2002 | Burton et al. |
| 2002/0078784 | A1 | 6/2002 | Hayashihara |
| 2003/0106392 | A1 | 6/2003 | Willemsen |
| 2003/0126941 | A1 | 7/2003 | Sauvonnet et al. |
| 2004/0226399 | A1 | 11/2004 | Hayashihara |
| 2006/0053948 | A1 | 3/2006 | Mahendra |

OTHER PUBLICATIONS

International Preliminary Report on Patentability dated Apr. 18, 2017 for Appln. No. PCT/IB2015/057805.

* cited by examiner

VARIABLE RATIO MECHANISM FOR ADJUSTABLE PEDALS TO MAINTAIN A CONSTANT RATIO

CROSS REFERENCE TO RELATED APPLICATION

This patent application claims priority to provisional patent application 62/064,360 filed on Oct. 15, 2014, and is incorporated by reference herein in its entirety.

BACKGROUND

Field of Disclosure

The present disclosure is generally related to an adjustable pedal assembly of a vehicle, and, more particularly, a variable ratio mechanism for the adjustable pedal, such as a pedal in a brake pedal assembly, whose position can be adjusted while maintaining a constant ratio.

Description of Related Art

Actuating assemblies for operating input elements of vehicles are well-known and include assemblies such as pedal assemblies and hand lever assemblies. A pedal, such as a brake pedal, is mounted to a dash panel in a vehicle so as to provide a driver easy access and manipulation via his/her foot. For example, known brake pedal assemblies include a pedal arm having one end that is pivotally mounted to a mounting structure (e.g., a bracket) provided in the vehicle to enable pivotal movement of the pedal arm about an operating pivot axis. The pedal arm includes an input connector in the form of a booster pin. This booster pin operatively connects to a master cylinder or brake booster push rod that is configured to actuate the master cylinder of the vehicle brake system for purposes of selectively engaging or disengaging the vehicle's brakes. The booster pin is positioned between the operating pivot axis of the pedal arm and a pedal foot pad at an end of the pedal arm opposite the end of the operating pivot axis.

The pedal assembly can have a fixed or static relationship between levers. That is, the master cylinder push rod attachment point, i.e., the brake booster pin, and the operating pivot axis of the pedal arm do not move relative to one another during pedal travel. The geometric pedal ratio for a fixed relationship between levers is typically expressed as R=a/b, where a is the distance between the operating pivot axis and the actuation point on the pedal foot pad, and b is the distance between the operating pivot axis and the master cylinder push rod attachment point, i.e., the booster pin.

With the new lines of vehicles and SUVs on the market, and the desire to utilize common components throughout the full range of vehicles (such as the pedal assemblies and the brake boosters), it is desirable to have an adjustable pedal so that persons of various sizes can access and reach the pedal. Some pedal assemblies can have a pedal arm and pad that can be adjusted between a first (e.g., rearward) position and a second (e.g., forward) position. However, movement of the pedal arm and pad between positions tends to alter the geometric ratio between the levers as well as the linear trajectory for movement and brake application.

SUMMARY

Provided herein is an adjustable pedal assembly for a vehicle for operating a push rod of a brake system, for example. The assembly includes an activation link connected via a pivot member to an elongated lever structure of the pedal arm, a link member for connection to the push rod to activate the brake system that is operatively connected to the activation link, and an adjustable slide pin for moving a pivot axis of the elongated lever structure between a first pivot position and a second pivot position. The pedal arm and pedal plate are thus moved between a first position and a second position, while maintaining a substantially constant ratio between each of the positions.

One aspect of the disclosure provides an adjustable pedal assembly for operating a push rod that activates a functional system of a vehicle. The adjustable pedal assembly is configured for movement between a first position and a second position. The adjustable pedal assembly includes a pedal arm having an elongated lever structure with a first end and a second end; a pedal plate provided on the second end of the elongated lever structure of the pedal arm for depression by a foot of a driver; and a vehicle mounting bracket. The assembly also includes a pivot member configured for pivoting relative to the vehicle mounting bracket about a first fixed pivot axis; an activation link, and a link member. A first end of the activation link is connected to the pivot member for pivoting therewith about the first fixed pivot axis and the second end of the activation link is connected to the elongated lever structure of the pedal. The link member has a first portion pivotally connected at a second fixed pivot axis to the activation link and a second portion connected to a booster receiver for connection to the push rod that activates the functional system of the vehicle. The first end of the elongated lever structure is configured for pivoting with an adjustable slide pin about a third variable pivot axis. The activation link and the link member each have a slot therein for movement of the adjustable slide pin therein. The third variable pivot axis of the adjustable slide pin is configured for adjustment between a first pivot position and a second pivot position in each slot. Movement of the adjustable slide pin between the first pivot position and the second pivot position varies a linear adjustment trajectory of the pedal arm relative to the pivot member in the first position and the second position of the adjustable pedal assembly, while a ratio between a distance between the first fixed pivot axis and the pedal plate and a distance between the first fixed pivot axis and the booster receiver remains substantially constant.

Another aspect of the disclosure provides a vehicle having an adjustable pedal assembly for operating a push rod that activates a functional system of a vehicle. The adjustable pedal assembly is configured for movement between a first position and a second position. The adjustable pedal assembly includes a pedal arm having an elongated lever structure with a first end and a second end; a pedal plate provided on the second end of the elongated lever structure of the pedal arm for depression by a foot of a driver; and a vehicle mounting bracket. The assembly also includes a pivot member configured for pivoting relative to the vehicle mounting bracket about a first fixed pivot axis; an activation link, and a link member. A first end of the activation link is connected to the pivot member for pivoting therewith about the first fixed pivot axis and the second end of the activation link is connected to the elongated lever structure of the pedal. The link member has a first portion pivotally connected at a second fixed pivot axis to the activation link and a second portion connected to a booster receiver for connection to the push rod that activates the functional system of the vehicle. The first end of the elongated lever structure is configured for pivoting with an adjustable slide pin about a third variable pivot axis. The activation link and the link member each have a slot therein for movement of the adjustable slide pin therein. The third variable pivot axis of the adjustable slide pin is configured for adjustment between a first pivot position and a second pivot position in each slot. Movement of the adjustable slide pin between the first pivot position and the second pivot position varies a linear adjustment trajectory of the pedal arm relative to the pivot member in the first position and the second position of the adjustable pedal assembly, while a ratio between a distance between the first fixed pivot axis and the pedal plate and a distance between the first fixed pivot axis and the booster receiver remains substantially constant.

Yet another aspect of this disclosure provides a method. The method includes adjusting an adjustable pedal assembly that activates a functional system of a vehicle between a first position and a second position, and operating a push rod of the adjustable pedal assembly in its position to active the functional system of a vehicle. The adjustable pedal assembly includes a pedal arm having an elongated lever structure with a first end and a second end; a pedal plate provided on the second end of the elongated lever structure of the pedal arm for depression by a foot of a driver; and a vehicle mounting bracket. The assembly also includes a pivot member configured for pivoting relative to the vehicle mounting bracket about a first fixed pivot axis; an activation link, and a link member. A first end of the activation link is connected to the pivot member for pivoting therewith about the first fixed pivot axis and the second end of the activation link is connected to the elongated lever structure of the pedal. The link member has a first portion pivotally connected at a second fixed pivot axis to the activation link and a second portion connected to a booster receiver for connection to the push rod that activates the functional system of the vehicle. The first end of the elongated lever structure is configured for pivoting with an adjustable slide pin about a third variable pivot axis. The activation link and the link member each have a slot therein for movement of the adjustable slide pin therein. The third variable pivot axis of the adjustable slide pin is configured for adjustment between a first pivot position and a second pivot position in each slot. Movement of the adjustable slide pin between the first pivot position and the second pivot position varies a linear adjustment trajectory of the pedal arm relative to the pivot member in the first position and the second position of the adjustable pedal assembly, while a ratio between a distance between the first fixed pivot axis and the pedal plate and a distance between the first fixed pivot axis and the booster receiver remains substantially constant.

Still yet another aspect of this disclosure provides an adjustable pedal assembly for operating a push rod that activates a functional system of a vehicle. The adjustable pedal assembly is configured for movement between a first position and a second position. The adjustable pedal assembly includes a pedal arm having an elongated lever structure with a first end and a second end; a pedal plate provided on the second end of the elongated lever structure of the pedal arm for depression by a foot of a driver; and a vehicle mounting bracket. The assembly also includes a pivot member configured for pivoting relative to the vehicle mounting bracket about a first fixed pivot axis; an activation link, and a link member. A first end of the activation link is connected to the pivot member for pivoting therewith about the first fixed pivot axis and the second end of the activation link is connected to the elongated lever structure of the pedal. The link member has a first portion pivotally connected at a second fixed pivot axis to the activation link and a second portion connected to a booster receiver for connection to the push rod that activates the functional system of the vehicle. The first end of the elongated lever structure is configured for pivoting with an adjustable slide pin about a third variable pivot axis. The activation link and the link member each have a slot therein for movement of the adjustable slide pin therein. The third variable pivot axis of the adjustable slide pin is configured for adjustment between a first pivot position and a second pivot position in each slot. Movement of the adjustable slide pin between the first pivot position and the second pivot position varies a linear adjustment trajectory of the pedal arm relative to the pivot member in the first position and the second position of the adjustable pedal assembly, and wherein a ratio between a distance between the first fixed pivot axis and the pedal plate and a distance between the first fixed pivot axis and the booster receiver is modified.

Other features and advantages of the present disclosure will become apparent from the following detailed description, the accompanying drawings, and the appended claims.

DETAILED DESCRIPTION OF THE PREFERRED EMBODIMENT(S)

The herein disclosed pedal assembly has linkage arrangement that is adjustable between at least a first position and a second position, that maintains a substantially constant or constant ratio in any/either position while still providing a linear adjustment trajectory, for example.

Figure 1:
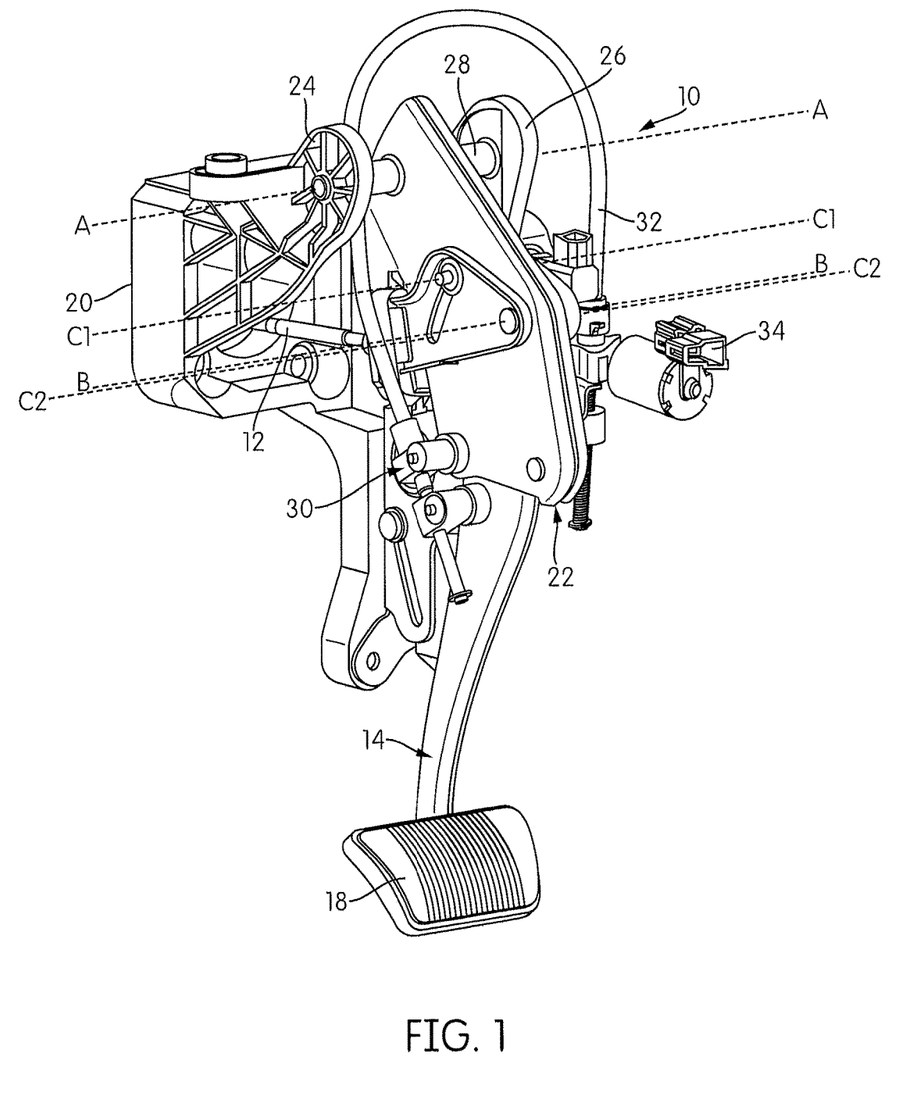
FIG. 1 illustrates a left perspective view of an adjustable pedal assembly mounted in a vehicle in accordance with an embodiment of the present disclosure.

FIG. 1 illustrates a perspective view of an adjustable pedal assembly 10 in accordance with an embodiment of the present disclosure. The adjustable pedal assembly 10 as described herein is designed to produce and apply a force to a functional system, e.g., brake booster, via a pedal assembly that can be moved between a first position and a second position. Further, despite the position of the pedal assembly, the ratio for moving the pedal arm and plate to apply force to the brake booster is the same or constant. In the illustrated embodiment, the adjustable pedal assembly 10 is in the form of a pedal assembly or "pedal", and particularly an adjustable brake pedal assembly for a vehicle. However, the assembly 10 may be a parking brake pedal assembly or any other lever assembly having a lever for which adjustment between at least two positions is desired.

Generally speaking, the terms "pedal", "pedal assembly", or "pedal structure" used interchangeably throughout this specification are not intended to be limit to a specific type of pedal device. It can be used for a brake pedal, along with a brake booster, a clutch, or an accelerator pedal. The pedal may be used with any functional system (e.g., mechanical or electro-mechanical system such as a brake system, transmission) of the vehicle. The method(s) of manufacturing parts of the pedals disclosed herein are not intended to be limiting, and may include single processes and/or secondary processes. For example, parts of the disclosed pedal assembly may be manufactured or formed via stamping, molding, piercing, punching, bending, and/or manual processes. Also, the materials used to manufacture the pedal assembly should not be limiting. The pedal and its parts could be made from one or more metal(s) such as steel (tubular or blade-type), or plastic materials, for example. The parts of the pedal assembly could also be made from a combination of such materials, e.g., both metal and plastic.

Referring now more particularly to the drawings, the adjustable pedal assembly 10, shown in FIG. 1, is a brake pedal 10 connected to a brake booster or other functional system. For explanatory purposes only, the pedal 10 is described with reference to a braking system, but should not be limited to such. The functional system of the vehicle may be a brake system or a transmission system, for example.

As noted above, the pedal assembly 10 may be also connected to parts of a clutch assembly, for example. The pedal assembly 10 is provided in the vehicle such that it is easily accessible for depression by a foot of a driver. For example, in some cases, the pedal assembly 10 is mounted in relation to panels of a dashboard and/or an instrument panel (IP). The dashboard of the vehicle, also referred to as the "dash", may comprise an upper panel and a lower panel that are connected to each other (e.g., using methods or devices known in the art). In some embodiments, the upper dash panel and lower dash panel may comprise a uniform or single piece. The panels are generally connected to a plurality of devices of the vehicle. For example, the dash may be connected to another vehicle structure, sometimes referred to as a front of dash (on a lower side or underside) or a firewall. A brake booster of the brake system may be fixed to the front of the dash panel or firewall and to brake pedal 10 via a push rod 12 and brake booster receiver 36 (described in greater detail below).

The pedal assembly 10 comprises a pedal arm 14. The pedal arm 14 has an elongated lever structure 13 with a first end and a second end. The elongated lever structure 13 is configured to be pivotally mounted, e.g., at or near a first end or along the structure, and has a pedal plate 16 provided on (or attached to) its second or distal end. The pedal plate 16 may optionally include a pedal cover 18 or pad. The pedal plate 16 is provided on the pedal arm 14 for depression by a foot of a driver.

In an embodiment, the pedal arm 14 is a brake pedal arm for operating an input element (e.g., push rod 12) connected to a brake booster or system of a vehicle.

The pedal plate 16 or part at the second or distal end of the elongated lever structure 13 is accessible by a foot of the driver or user such that an application of force by the driver's or user's foot may be applied thereto. During normal operation, a driver or user of a vehicle may apply force via his foot on the pedal plate 16 (or cover 18) to activate a functional system of the vehicle (e.g., brake booster of the brake system). "Normal" operation circumstances as referred to throughout this description is defined by a time during which a vehicle is being operated safely and without incidence of impact such as caused by a crash or collision with another vehicle, person, or object. Thus, in the embodiment being described herein, the force from a driver or user's foot is configured to cooperate with brake booster to translate pivotal motion into a braking force to be applied to the wheels of the vehicle. Such methods for applying a braking force (and the pivotal translation) are known in the art and therefore not discussed in detail herein.

Figure 4:
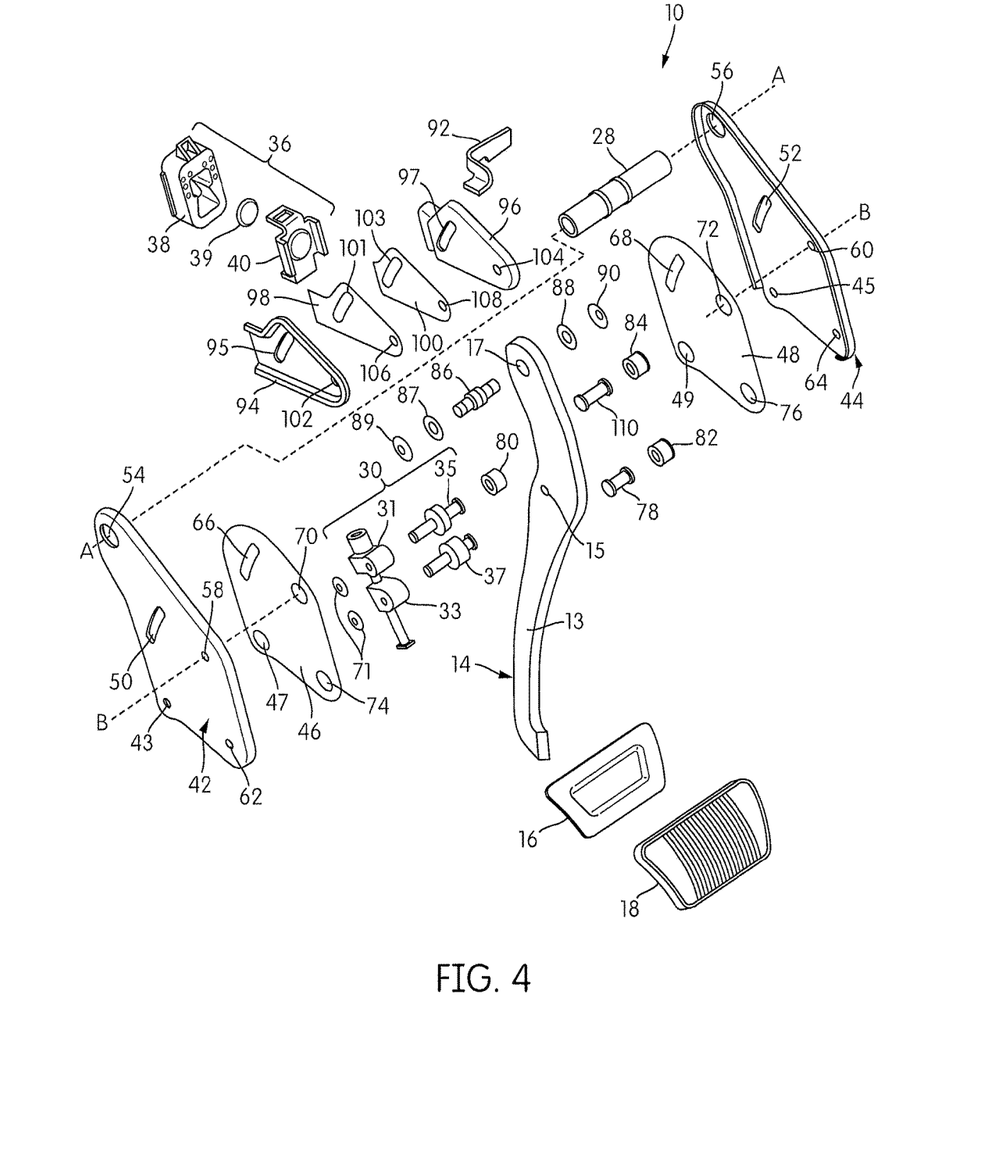
FIG. 4 illustrates an exploded view of the adjustable pedal assembly of FIG. 1.
Figure 5:
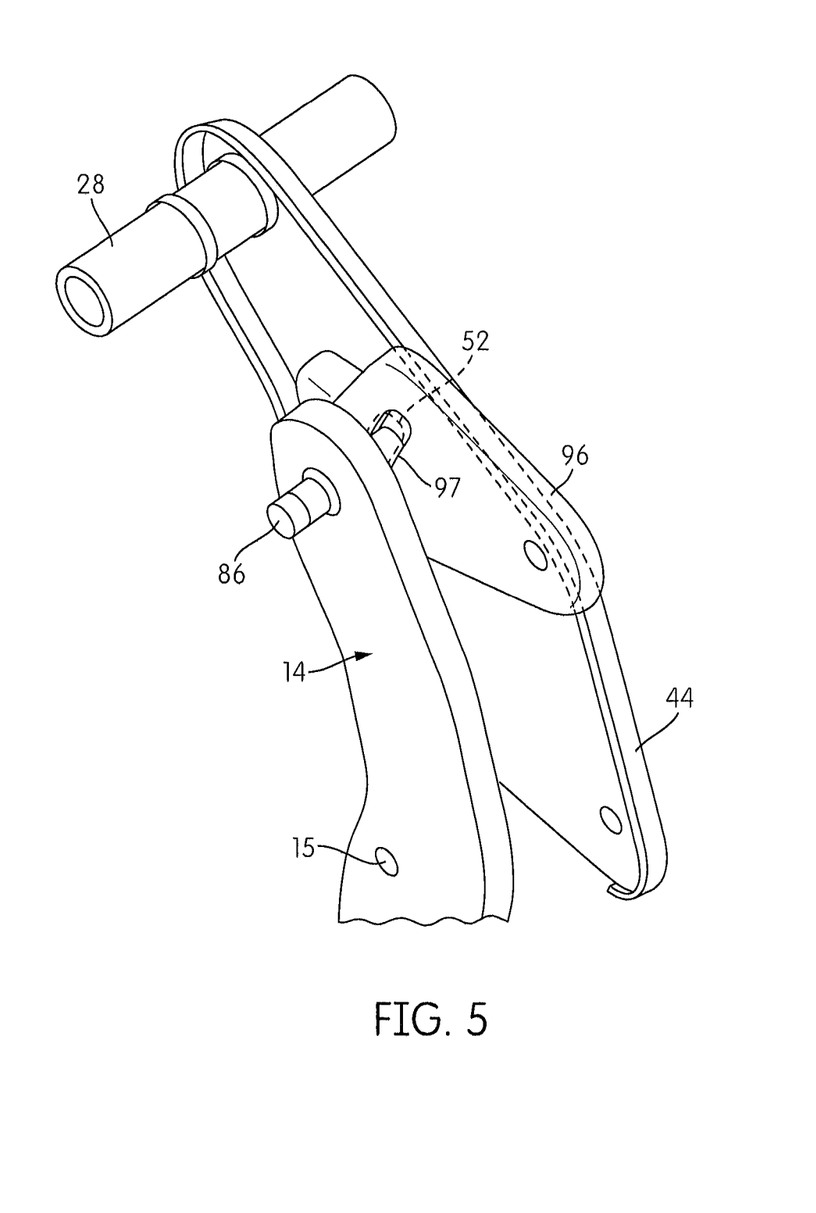
FIG. 5 illustrates a detailed view of parts of the adjustable pedal assembly of FIG. 1.

Specifically, the push rod 12 is configured to activate the functional system (e.g., braking device) of the vehicle. The push rod 12 extends through the vehicle structure (dash or lower panel) and is connected to the brake booster receiver 36. An end of the push rod 12 is connected to a booster retainer bracket 38 of the brake booster receiver 36, for example. As seen in FIG. 4, the booster retainer bracket 38 may include an opening for receipt of the end of the push rod 12 therethrough. In one embodiment, as illustrated in the Figures, the end of the push rod 12 may be connected via a booster cap 39 to a booster bracket 40, allow for a snap-in or snap-fit connection, for example. However, the illustrated attachment mechanism for the booster rod is not intended to be limiting. That is, other types of attachment devices or mechanism may be used, including, but not limited to, a booster pin (e.g., on the pedal arm) or a clevis-type joint (e.g., to the pushrod). The type of attachment used for attaching the booster and push rod may vary from OEM to OEM a chosen based on the manufactured device. The push rod 12 translates the pivoting force applied by the foot of the driver as he pushes on the pedal plate 16 to the brake booster. Thus, the pedal arm 14 may be a brake pedal arm for operating a brake booster input element of the vehicle.

Figure 2:
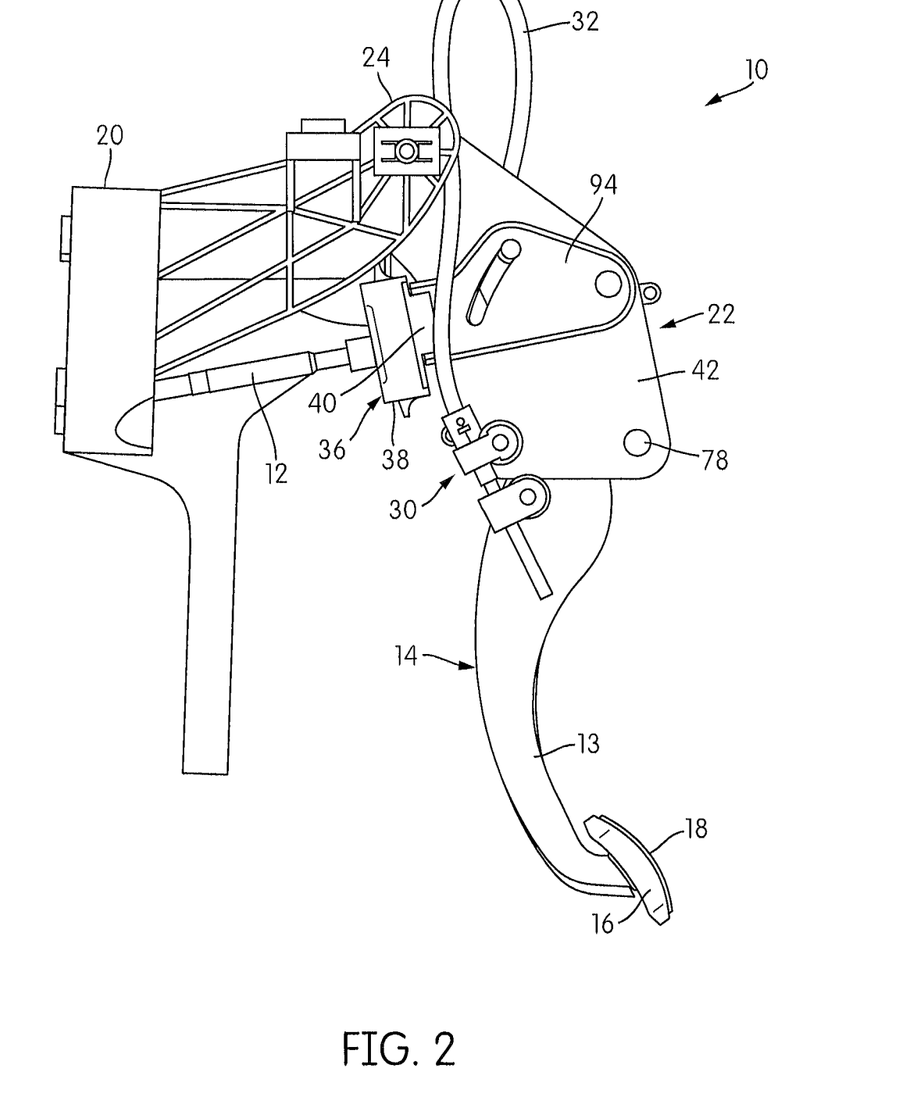
FIG. 2 illustrates a side view of the adjustable pedal assembly of FIG. 1.

Push rod 12, which may comprise a larger portion and a smaller portion, assists in translating an applied force on the pedal plate 16 to the brake booster. A pedal arm 14 is not directly connected to an end of the push rod 12 or directly connected to a single link or a bracket that is directly connected to the end of the push rod 12. Rather, the pedal arm 14 is connected to the push rod 12 via a linkage assembly 22 that is moved to activate the push rod 12. The linkage assembly 22 includes at least one activation link 41 (e.g., including links 42 and 44) and at least one link member (e.g., including links 94 and 96). Generally, when force is applied to the pedal plate 16 by a foot of a user, the elongated structure 13 is pivoted, which in turn activates the activation link(s) and the link member(s) and pushes the push rod 12, so that a spring or mechanism of the brake booster is compressed. The push rod 12 is coupled to the linkage assembly 22 via the brake booster receiver 36. For example, the push rod 12 may be connected to the at least one link member via the booster bracket 40 which may be, as shown in FIG. 2, connected to an end of the link member 94.

In accordance with an embodiment, the linkage of the linkage assembly of the pedal may be provided above an underside of the instrument panel. Alternatively, one or more of the links may be provided above the underside of the instrument panel. In an embodiment, the linkage can also be provided above an underside or lower portion of the dash.

In some embodiments, the elongated lever structure 13 of the pedal arm 14 may be pivotally connected to a pedal bracket 20 via the activation linkage 41 and link member of the linkage assembly 22 and a pivot member 28. Pedal bracket 20 may optionally be a vehicle mounting bracket used for mounting to the vehicle structure, using fasteners within its holes, and/or in cooperation with other brackets or block mounts, such as block mount, for connecting the pedal arm 14 to the vehicle. Of course, the devices used for mounting and their design are not meant to be limiting; thus, alternate designs and assemblies for connecting a pedal to a vehicle may be used and would not be considered beyond the scope of the present disclosure. Also, the shape and design of the pedal arm 14 is not intended to be limiting. For example, in embodiments, the pedal arm 14 can be a solid structure, a tubular structure, or include a channel in and/or along its structure (e.g., a "U"-channel shape). Other designs, mountings, and structure shapes could be implemented in the herein disclosed pedal assembly without departing from this disclosure, as would be understood to one of ordinary skill in the art.

In addition to mounting the pedal assembly 10, the pedal bracket 20 may act as a casing surrounding at least a portion of the linkage assembly 22 of the pedal assembly 10, e.g., to protect the linkage assembly contained therein.

The pivot member 28 is configured for pivoting relative to the vehicle mounting bracket, or pedal bracket 20, about a first fixed pivot axis A-A (or stationary axis). Upon application of force to the pedal plate 16 and pedal arm 14, the linkage assembly 22 can be pivoted, which in turn pivots the pivot member 28 about the first fixed pivot axis A-A. Additional details regarding the pivotal movement of the linkage assembly 22 are disclosed further below. In an embodiment, and as illustrated in the Figures, the pivot member 28 is a pivot tube.

As previously noted, the linkage assembly 22 includes at least one activation link 41 (see FIG. 3) and at least one link member. The activation link 41 cooperates with the linkages to push the push rod 12 and activate the brake or booster. The at least one link member enables the adjustable pedal assembly to move between a first position and a second position, while maintaining a substantially constant or constant ratio in any/either position and while still providing a linear adjustment trajectory.

As shown in the Figures herein, the activation link 41 and the at least one link member may each include two parts, e.g., a left part and a right part. For example, in one embodiment, activation link 41 includes a first link 42, bracket, or side plate (e.g., shown on a left side in FIG. 3) and a second link 44, bracket, or side plate (e.g., shown on a right side in FIG. 3). The first link 42 and the second link 44 may be provided in a parallel configuration. A first end of each of the first and second links 42, 44 of the activation link 41 is connected to the pivot member 28 or tube for pivoting therewith about the first fixed pivot axis A-A. The second end of each of the first and second links 42, 44 of the activation link 41 is connected to the elongated lever structure 13 of the pedal assembly 10 and connected to each other, for example, via a spring guide pin 68.

Figure 3:
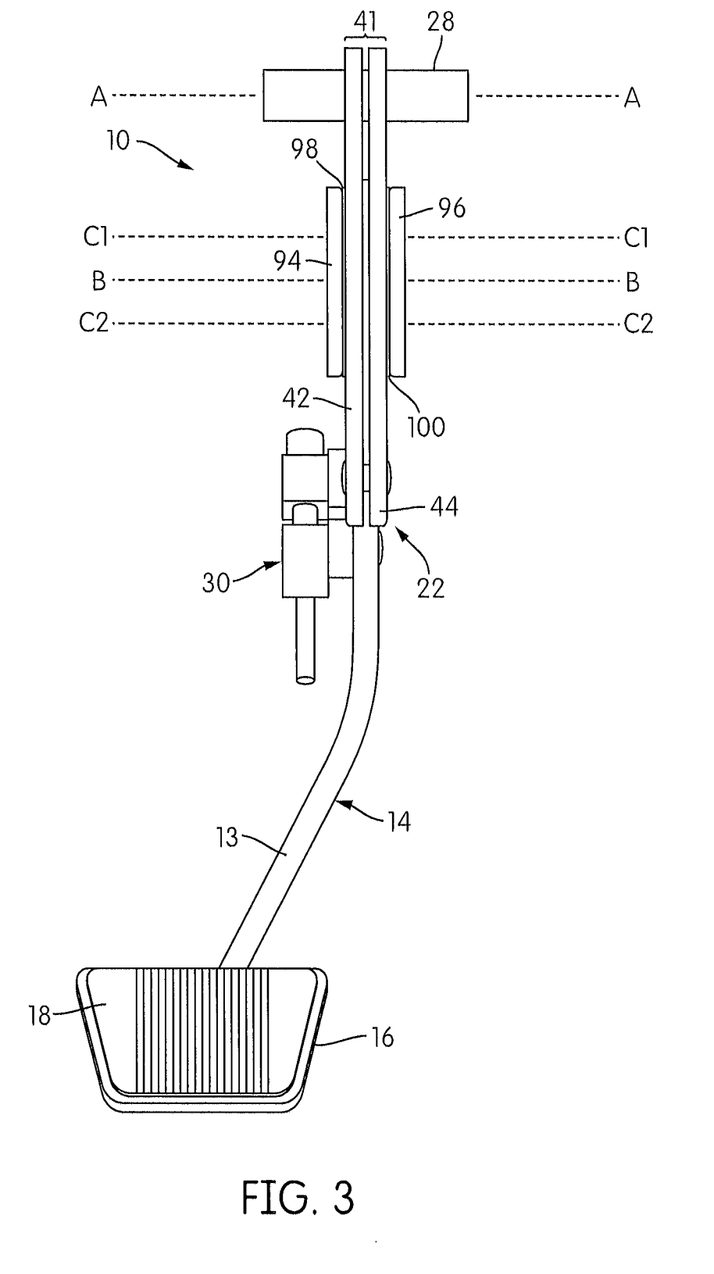
FIG. 3 illustrates a front view of the adjustable pedal assembly of FIG. 1.

In one embodiment, the at least one link member includes a first rocker plate 94 or link member (e.g., shown on a left side in FIG. 3) and a second rocker plate 96 or link member (e.g., shown on a right side in FIG. 3). The first rocker plate 94 and the second rocker plate 96 may be provided in a parallel configuration.

Of course, a single link may also be provided for activation link 41 and/or the link member. The illustrated embodiments are not intended to be limiting.

A first end of each of the first and second rocker plates 94, 96 of the link member may be connected to the activation link 41. Each rocker plate 94, 96 of the link member has a first portion pivotally connected at a second fixed pivot axis B-B to the first and second links 42, 44 of the activation link 41. The second fixed pivot axis B-B is defined by a rocker pin 110 that extends through the links 42, 44 and connects the rocker plates 94, 96. In one embodiment, the second fixed pivot axis B-B is positioned horizontally below the first fixed pivot axis A-A. This is shown in FIG. 1, for example. A second end or portion of each rocker plate 94, 96 is connected to a connection or activation member associated with the functional system of the vehicle. In an embodiment, the link member is constructed to be connected to the push rod 12 of the brake booster input element. Thus, the second end or portion of each rocker plate 94, 96 may be connected to the brake booster receiver 36, as shown in FIGS. 1 and 2, to provide a connection to the push rod 12 to activate the functional system of the vehicle.

In an embodiment, the link member is provided radially outside of the activation link 41 on the second fixed pivot axis B-B. For example, as seen in FIG. 3, the rocker plates 94, 96 may be provided radially outside of the first and second links 42, 44 of the activation link 41.

The first end of the elongated lever structure 13 is configured for pivoting with an adjustable slide pin 86 about a third variable pivot axis. The first end of the elongated structure 13 can include a receiving opening 17 designed to accommodate the adjustable slide pin 86, for example. The third variable pivot axis may be position at a first pivot position, represented by an axis C1-C1 in the Figures, and at least a second pivot position, represented by an axis C2-C2 in the Figures.

In particular, movement between the two positions may be executed via the disclosed activation link 41 and link member. In an embodiment, the activation link 41 and the at least one link member each have a slot therein for movement of the adjustable slide pin 86 therein. More specifically, the first link 42 includes a slot 50, the second link 44 includes a slot 52, the first rocker plate 94 includes a slot 95, and the second rocker plate 96 includes a slot 97. The slots 50, 52, 95, and 97 receive a portion of the slide pin 86 therein, such that the slide pin 86 moves along the slot. The positioning of the adjustable slide pin 86 within the slots can define a first pivot position and a second pivot position. In one embodiment, the adjustable slide pin 86 is configured for placement at a first end of each slot 50, 52, in the links 42, 44 of the activation link 41 and at a first end of each slot 95, 97 in the rocker plates 94, 96 of the link member in a first position (e.g., FIG. 6) of the adjustable pedal assembly, and the adjustable slide pin 86 is configured for placement at a second end of each slot 50, 52, in the links 42, 44 of the activation link 41 and at a first end of each slot 95, 97 in the rocker plates 94, 96 of the link member in a second position (e.g., FIG. 8). As such, the third variable pivot axis of the adjustable slide pin 86 is configured for adjustment between a first pivot position along a first pivot axis C1-C1 and a second pivot position along a second pivot axis C2-C2 in and relative to each slot.

In an embodiment, the slots 95 and 97 associated with the rocker plates 94, 96 of the link member are arcuate slots disposed radially outwardly from the slots 50, 52 of the activation link 41. In one embodiment, the slots 50, 52 of the first and second links 42, 44 are also arcuate in shape.

Figure 6:
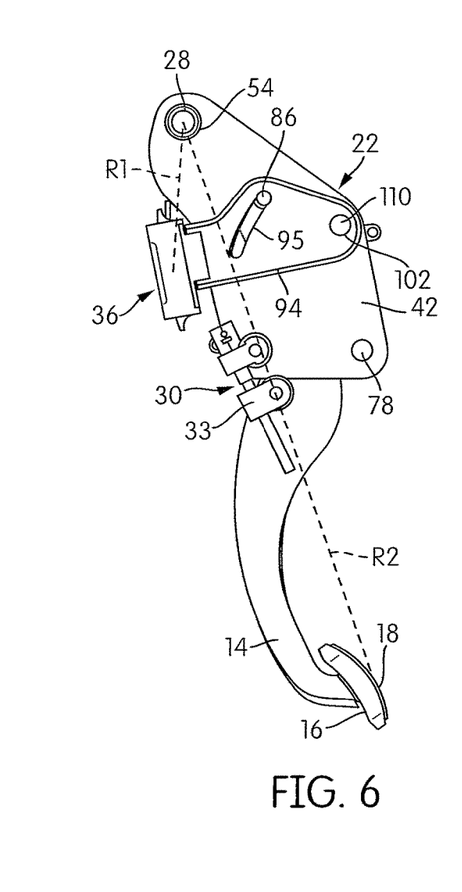
FIG. 6 illustrates a side view of the adjustable pedal assembly of FIG. 1 in a first position.
Figures 7, 8:
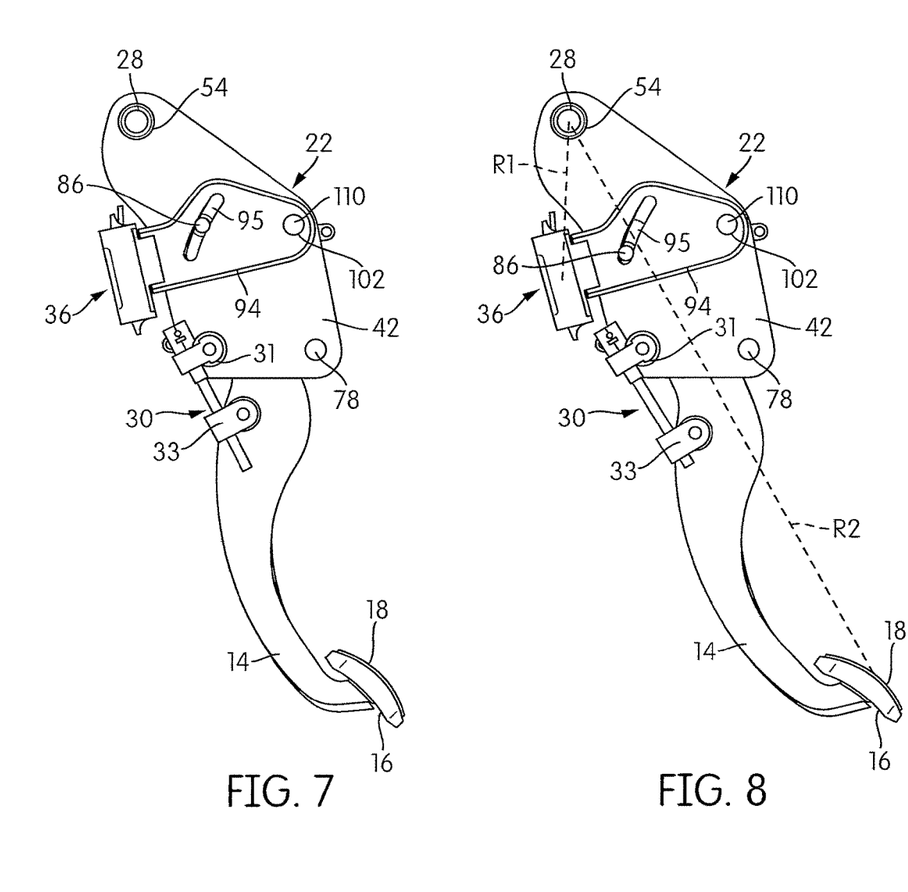
FIG. 7 illustrates a side view of the adjustable pedal assembly of FIG. 1 between a first and second position.
FIG. 8 illustrates a side view of the adjustable pedal assembly of FIG. 1 in a second position.

In addition to varying the pivot position of the elongated pedal structure 13 of the pedal arm 14, movement of the pedal assembly between the at least two pivot positions varies the position of the pedal arm 14 and its pedal plate 16 within the vehicle. For example, as viewed in FIGS. 6 and 8, when the adjustable slide pin 86 is provided at a first pivot position, the pedal arm 14 and its plate 16 is provided at a first (e.g., rearward) position (FIG. 6), and when the adjustable slide pin 86 is provided at the second pivot position, the pedal arm 14 and its plate 16 is provided at a second (e.g., forward) position (FIG. 8).

Accordingly, the movement of the adjustable slide pin 86 between the first pivot position about C1-C1 and the second pivot position about C2-C2 varies a linear adjustment trajectory of the pedal arm 14 relative to the pivot member 28. In an embodiment, the movement of the adjustable slide pin 86 between the first pivot position and the second pivot position varies a position of the pedal plate 16 along a predetermined path between a first position and second position.

However, although the linear adjustment trajectory of the pedal arm 14 may be altered relative to the pivot member 28, the disclosed pedal assembly 10 is designed to maintain a substantially constant ratio between a distance between the first fixed pivot axis A-A and the pedal plate 16 and a distance between the first fixed pivot axis A-A and the booster receiver 36. Generally, as a pedal is depressed, the amount and direction of movement is governed by the geometry of the parts in the noted position. In the industry, pedal assemblies have brake ratios that may vary between about 2.0:1 up to about 6.0:1, or even beyond. The pedal assembly 10 of this disclosure provides and allows such ratios to be approximately or substantially (if not entirely) maintained despite the position (i.e., first (or rearward) position or second (or forward) position) of the pedal plate 16 and the pedal arm 14.

The exploded view of FIG. 4 illustrates each of the parts of the adjustable pedal assembly 10 in greater detail, in accordance with an embodiment herein. The elongated lever structure 13 has pedal plate 16 and cover 18 provided on (or attached to) its second or distal end so that it is accessible to the foot of the driver of the vehicle. The pedal arm 14 is connected to the push rod 12 via the linkage assembly.

As noted above, in the embodiment illustrated in FIGS. 1-8, the activation link comprises a first link 42 and a second link 44 arranged in a parallel configuration on pivot member 68. The links 42, 44 of the activation link 41 are configured to pivot with the pivoting of the pivot member 68, based on the pivotal movement of the pedal. A first end of each link 42, 44 is configured to be connected to a pivot member 68, tube, or shaft, e.g., via insertion of the pivot member 68 through opening 54 in link 42 and through opening 56 in link 44. The ends of the pivot member 68 may be attached to and configured for pivoting relative to the vehicle mounting bracket 20, as shown in FIG. 1, for example. A second end of each link 42, 44 is connected to the elongated lever structure 13 of the pedal arm 14 via a brake booster 30. The brake booster 30 may include a connection tube 32 (see FIG. 1) that is connected to an actuator for boosting the application of the brake. Such an actuator or system is generally known by one of ordinary skill in the art, and thus is not described in detail herein. As an example, the first link 42 includes an opening 43 and the second link 44 includes an opening 45 for accommodating a cam pin 35 that extends through each opening 43, 45 and is secured in a connector 31 of the brake actuator 30 (e.g., secured via a push nut 74). The elongated lever structure 13 includes a receiving opening 15 for accommodating an actuator mount pin 37 that extends through the receiving opening 15 and is secured to a connector 33 of the brake actuator 30 (e.g., secured via a push nut 74). Under normal operation, as the pedal arm 14 rotates pivot member 68 with respect to the dash and vehicle structure, the at least a part of the push rod 12 is moved to apply a braking force.

The elongated lever structure 13 of the pedal arm 14 is connected to the activation link 41 (e.g., formed by first and second links 42, 44) by insertion of the adjustable slide pin 86 through a receiving opening 17 or slot at its first end designed to accommodate and optionally lock the slide pin 86 therein. Generally, when forced is applied to the pedal plate 16 by a foot of a user, the elongated structure 13 is pivoted, which in turn activates the activation link 41 and pushes the push rod 12, and the mechanism of the brake booster 36 is compressed or applied.

The adjustable slide pin 86 extends through slots 50 and 52 of the parallel links 42, 44 (respectively). The first link 42 is provided on a first (left) side of the elongated structure 13 and the second link 44 is provided on a second (right) side of the elongated structure 13. The slide pin 86 may be secured in or relative to the links 42, 44 with washers 87, 88 and/or push nuts 89, 90 on either of its ends. The placement of the washers 87, 88 and/or push nuts 89, 90 is not limited. For example, to secure the links 42, 44, the push nuts 89, 90 may be provided on the slide pin 86 adjacent to an outside surface (i.e., the surface not facing the elongated structure 13, or laterally outside) of the links 42, 44. Securement of the slide pin 86 relative to these and other parts should be understood to one of ordinary skill in the art and is thus not described in further detail herein.

Also shown in FIG. 4 are anti-rattle spacers 46 and 48. The spacers 46, 48 may be provided in a parallel configuration on either side of the elongated structure 13, between the elongated structure 13 and one of the links 42, 44 of the activation link 41. The spacer 46 may be provided on the first (left) side and the spacer 48 may be provided on the second (right) side of the elongated structure 13. As seen in FIG. 3, when assembled, the spacers 46, 48 may not be seen and may be captured within the links 42, 44. That is, each of the links 42, 44 may include a lip which defines a space for receiving the spacers 46, 48 therein. The spacers 46, 48 may reduce and/or substantially prevent movement and rattling during movement of the pedal arm 14. The spacers 46, 48 may include slots 66, 68, respectively, for accommodating the placement of the adjustable slide pin 86 therethrough.

The adjustable slide pin 86 further extends through the slots 95 and 97 of the rocker plates 94, 96. As explained in detail later, when the pedal assembly is adjusted between its first and second positions, the adjustable slide pin 86 is guided in and slides along the slots 50, 52 of the links 42, 44 of the activation link 41 and the slots 95, 97 of the rocker plates 94, 96 of the link member so that pedal arm 14 position is changed. The elongated lever structure 13 is capable of movement an application of the brake at at least either position.

The first rocker plate 94 is provided on a first (left) side of the elongated structure 13 and the second rocker plate 96 is provided on a second (right) side of the elongated structure 13. More specifically, the first rocker plate 94 may be provided laterally outside the first link 42 (as shown in FIG. 3) and the second rocker plate 96 may be provided laterally outside the second link 44. The rocker plates 94, 96 further include openings 102 and 104, respectively therein for receipt of the rocker pin 110. More specifically, the rocker pin 110 extends through holes 58 and 50 of the links 42, 44 and connects the rocker plates 94, 96 via insertion through openings 102 and 104. Anti-rattle spacers 46, 48 may also include openings 70, 72, respectively, to receive and accommodate the rocker pin 110 therethrough. In an embodiment, a spacer 84 is also optionally provided with the rocker pin 110.

Rocker spacers 100 and 101 may also be used with the rocker plates 94, 96. The rocker spacers 98, 100 may be provided in a parallel configuration on outer sides of the links 42, 44, between one of the links 42, 44 of the activation link 41 and one of the rocker plates 94, 96. The spacer 98 may be provided on the first (left) side and the spacer 100 may be provided on the second (right) side laterally outside of the links 42, 44 (respectively), as seen in FIG. 3. The spacers 46, 48 may reduce and/or substantially prevent rattling and wear during movement of the pedal arm 14. The spacers 98, 100 may include slots 101, 103, respectively, for accommodating the placement of the adjustable slide pin 86 therethrough. The spacers 98, 100 may include holes 106, 108, respectively, for accommodating the placement of the rocker pin 110 therethrough. The spacers 98, 100 may include a lip which defines a space for accommodating the ends of the pins 86 and 110 therein.

Also shown in the Figures as part of the assembly 10 is a switch flag 92 (see FIG. 4). As generally known in the art, the switch flag 92 is used to activate a plunger of a switch that controls brake lights; e.g., as the pedal is depressed, the plunger position moves and turns the lights on or off accordingly. One of ordinary skill in the art understands its mounting and positioning relative to the pedal parts, and thus further description regarding these parts is not provided herein.

A spring guide pin 78 may also be provided and used to connect the first and second links 42, 44 of the activation link 41. The links 42, 44 include first and second holes 62, 64, respectively, for receipt of the spring guide pin 78. Anti-rattle spacers 46, 48 also include corresponding holes 74 and 76, respectively, for alignment with the holes 62, 64 and thus receipt of the spring guide pin 78 therethrough. A cam pin spacer 82 may optionally be used with the spring guide pin 78.

The rocker pin 110 and/or spring guide pin 78 may be in the form of an I-pin, for example.

Accordingly, when assembled, the first and second links 42, 44 are secured relative to the pivot member 68 (e.g., welded). Pivotal movement of the pedal arm 14 pivotally moves the pivot member 68 relative to the vehicle mounting bracket 20, thus pivotally moving the links 42, 44 of the activation link 41. The activation link 41 is thus configured to pivot or rotate with the pivot member 68 upon any pivoting movement of the elongate lever structure 13 of the pedal 12. The third axis on which the elongated lever structure 13 pivots, i.e., axis C1-C1 or C2-C2, is based on the position of the pedal arm 14.

In operation, when the pivotal movement of the pedal arm 14 pivotally moves the pivot member 68 relative to the vehicle mounting bracket 20, the pivotal movement of the pivot member 68 actuates pivotal movement of the activation link (links 42, 44) and moves the rocker plates 94, 96. The movement of the rocker plates 94, 96 enables pushing of the push rod 12.

In accordance with the above structure, it operates in a similar manner despite whether the pedal is in a first position or a second position (or other position). The positions of the pedal assembly, ratios and distances are representatively shown in FIG. 6 and FIG. 8. For example, in one embodiment, in the first position of the adjustable pedal assembly 10, the links 42, 44 of the activation link 41 pivot with the pivot member 28 (or tube) about the first fixed axis A-A, the rocker plates 94, 96 of the link member pivot about the second fixed pivot axis B-B, and the adjustable slide pin 86 pivots about the third variable pivot axis C1-C1 at the first pivot position. In the second position of the adjustable pedal assembly 10, the links 42, 44 of the activation link 41 pivot with the pivot member 28 about the first fixed axis A-A, the rocker plates 94, 96 of the link member pivot about the second fixed pivot axis B-B, and the adjustable slide pin 86 pivots about the third variable pivot axis C2-C2 at the second pivot position.

In one embodiment, an angle formed between pedal plate 16 and the booster receiver 36 relative to the pivot member 28 at the first pivot position is different than an angle formed between pedal plate 16 and the booster receiver 36 relative to the pivot member 28 at the second pivot position. In an embodiment, the above-defined angle at the first position is less than the angle at the second position. Both angles may be acute angles, however.

As may be observed in FIGS. 4, 6 and 8, in accordance with an embodiment, the second pivot position of the adjustable slide pin 86 at C2-C2 is positioned horizontally below the first pivot position of the pin 86 at C1-C1.

The geometric pedal ratio between the "levers" (i.e., the two distances between the first fixed pivot axis A-A and the pedal plate 16 and between the first fixed pivot axis A-A and the booster receiver 36) is expressed as R=R2/R1, where R2 is the distance between the operating pivot axis and the actuation point on the pedal foot pad, and R1 is the distance between the operating pivot axis and the master cylinder push rod attachment point, i.e., the booster receiver 36. The distances R1 and R2 are altered based on the position of the pedal assembly.

The chart below illustrates an example of measured ratios and calculations pertaining to the same of the disclosed adjustable pedal assembly 10 when in a full forward position in the vehicle (FFIV) (e.g., see FIG. 8), or first position, and when in a full rear position in the vehicle (FRIV) (e.g., see FIG. 6), or second position. In this embodiment, for illustrative and test purposes only, three different versions brake ratios were considered: 3.8:1, 4.2:1, and 4.75:1.

| Comparison of FFIV and FRIV | | | |
|---|---|---|---|
| Ratio Version and Position | R1 | R2 | Ratio R2/R1 |
| 3.8   FFIV | 103.57 | 393.58 | 3.8 |
|        FRIV | 110.83 | 421.92 | 3.805 |
| 4.2   FFIV | 91.47 | 384.15 | 4.2 |
|        FRIV | 98.85 | 414.36 | 4.192 |
| 4.75  FFIV | 78.77 | 374.17 | 4.75 |
|        FRIV | 85.67 | 406.61 | 4.746 |

As shown by the above example, the desired brake ratio—i.e., 3.8, 4.2, or 4.75—is substantially maintained by the disclosed pedal assembly 10 despite its change linear adjustment trajectory. The trajectory of the pads in either position FFIV or FRIV is adjusted, but the linear movement enables the same ratio to be applied.

Of course, the above ratios noted above are ratios that were selected for testing and illustrative purposes only, and it should be understood that similar results may be implemented for other selected brake ratios (e.g., between about 2.0:1 up to about 6.0:1, or beyond).

Further, it is noted that the assembly 10 provides a booster pushrod angularity throughout stroke that is plus or minus 3 degrees or less.

Accordingly, the adjustable pedal assembly 10 as disclosed herein maintains a substantially constant ratio while still providing a linear adjustment trajectory of the pedal arm 14. The ratio is substantially unaffected even if the parts of the pedal are adjusted. This way, when a driver applies the brakes, there is a constant ratio applied.

In accordance with an embodiment, the at least one link member may be provided as a retrofit component that can be provided on an adjustable pedal assembly. For example, the rocker plates 94, 96 and optional spacers 98, 100 may be provided in a package that is designed for sale such that the link member can be assembled and applied to an existing adjustable pedal assembly. In some cases, minor machining of parts may be required.

The link member as disclosed herein adds very little weight to a pedal assembly (e.g., approximately 320 g). In some cases, the parts of the pedal structure, e.g., the elongated lever structure 13, may further be adjusted to save or accommodate the little weight that is added. For example, in an embodiment, a hollow or tubular pedal structure (as opposed to a solid structure) can be used to save approximately 500 g in total weight, thus cancelling out any added weight of the link member (rocker plates 94, 96 and spacers 98, 100).

Also, it should be noted that the pedal assembly 10 may also be used in combination with any number of sensing devices or sensors.

Accordingly, it should be understood that the embodiments herein provide examples of aspects and features provided by this disclosure. One aspect of the disclosure provides an adjustable pedal assembly for operating a push rod that activates a functional system of a vehicle. The adjustable pedal assembly is configured for movement between a first position and a second position. The adjustable pedal assembly includes a pedal arm having an elongated lever structure with a first end and a second end; a pedal plate provided on the second end of the elongated lever structure of the pedal arm for depression by a foot of a driver; and a vehicle mounting bracket. The assembly also includes a pivot member configured for pivoting relative to the vehicle mounting bracket about a first fixed pivot axis; an activation link, and a link member. A first end of the activation link is connected to the pivot member for pivoting therewith about the first fixed pivot axis and the second end of the activation link is connected to the elongated lever structure of the pedal. The link member has a first portion pivotally connected at a second fixed pivot axis to the activation link and a second portion connected to a booster receiver for connection to the push rod that activates the functional system of the vehicle. The first end of the elongated lever structure is configured for pivoting with an adjustable slide pin about a third variable pivot axis. The activation link and the link member each have a slot therein for movement of the adjustable slide pin therein. The third variable pivot axis of the adjustable slide pin is configured for adjustment between a first pivot position and a second pivot position in each slot. Movement of the adjustable slide pin between the first pivot position and the second pivot position varies a linear adjustment trajectory of the pedal arm relative to the pivot member in the first position and the second position of the adjustable pedal assembly, while a ratio between a distance between the first fixed pivot axis and the pedal plate and a distance between the first fixed pivot axis and the booster receiver remains substantially constant.

Another aspect of the disclosure provides a vehicle having an adjustable pedal assembly as noted above. Yet another aspect of this disclosure includes a method that includes adjusting an adjustable pedal assembly that activates a functional system of a vehicle between a first position and a second position, and operating a push rod of the adjustable pedal assembly in its position to active the functional system of a vehicle. The adjustable pedal assembly includes a pedal arm having an elongated lever structure with a first end and a second end; a pedal plate provided on the second end of the elongated lever structure of the pedal arm for depression by a foot of a driver; and a vehicle mounting bracket. The assembly also includes a pivot member configured for pivoting relative to the vehicle mounting bracket about a first fixed pivot axis; an activation link, and a link member. A first end of the activation link is connected to the pivot member for pivoting therewith about the first fixed pivot axis and the second end of the activation link is connected to the elongated lever structure of the pedal. The link member has a first portion pivotally connected at a second fixed pivot axis to the activation link and a second portion connected to a booster receiver for connection to the push rod that activates the functional system of the vehicle. The first end of the elongated lever structure is configured for pivoting with an adjustable slide pin about a third variable pivot axis. The activation link and the link member each have a slot therein for movement of the adjustable slide pin therein. The third variable pivot axis of the adjustable slide pin is configured for adjustment between a first pivot position and a second pivot position in each slot. Movement of the adjustable slide pin between the first pivot position and the second pivot position varies a linear adjustment trajectory of the pedal arm relative to the pivot member in the first position and the second position of the adjustable pedal assembly, while a ratio between a distance between the first fixed pivot axis and the pedal plate and a distance between the first fixed pivot axis and the booster receiver remains substantially constant.

While the principles of the disclosure have been made clear in the illustrative embodiments set forth above, it will be apparent to those skilled in the art that various modifications may be made to the structure, arrangement, proportion, elements, materials, and components used in the practice of the disclosure.

For example, other additional or alternative sensing, electronic, or communication devices can be used with the adjustable pedal assembly disclosed herein and are not limited to those that are illustrated in the Figures.

Also, it should be understood that each structure of the pedal assembly 10 can be altered without departing from the scope of this disclosure. For example, pedal bracket 20 may be combined or incorporated into or with a block mount or other structure, though not shown, for connection to part of the vehicle.

A controller (not shown) may be associated with the adjustable pedal assembly for controlling and/or adjusting the pivot position of the pedal. In an embodiment, an adjuster mechanism (not shown) may also or alternatively be included. For example, the controller may drive the pedal system between at least its first and second pivot positions. In an embodiment, the controller and/or adjuster system may include a motor (e.g., DC motor) and a gearing system. The gearing system may be the gearing system that is connected to the accelerator pedal assembly, for example, which is designed to also drive the disclosed mechanism on the brake pedal (or clutch, or accelerator pedal). When a driver operates a switch in the vehicle, for example, the controller may command the motor to move and drive the system (e.g., between a first pedal position and a second pedal position).

Accordingly, it should be understood that one or more of the parts of the herein disclosed assembly (e.g., such as the link members and adjustable slide pin) may be designed as part of a system that is configured to be retrofit or added onto a pedal assembly in a vehicle. Thus, an existing pedal assembly can be modified via the addition of such disclosed parts to have a constant (or modified) ratio between at least a first and a second pedal position (forward or rearward position).

Further, it is noted that, although the parts of the pedal assembly have been previously described as maintaining a substantially constant ratio between at least a first position and a second position of the pedal assembly, one of ordinary skill in the art may further understand that the herein disclosed assembly and/or its parts (when added to an existing pedal assembly, for example) may be implemented and/or used to adjust the ratio such that it is modified or changed between the first position and the second position (i.e., not substantially constant). More specifically, in one embodiment, movement of the adjustable slide pin between the first pivot position and the second pivot position may vary a linear adjustment trajectory of the pedal arm relative to the pivot member in the first position and the second position of the adjustable pedal assembly, and a ratio between a distance between the first fixed pivot axis and the pedal plate and a distance between the first fixed pivot axis and the booster receiver may be altered, modified, or changed. For example, in one embodiment, the modification of the ratio between the first and second positions of the pedal assembly may be implemented via altering a design of the slot(s) of the link member(s). In an embodiment, a slot in an activation link may also or alternatively be used to enable adjustment of the ratios between the first and second position. Rather than the link member(s) and/or activation link(s) having arcuate-shaped slot(s), for example, the slot(s) may include a bend or angle that is designed to adjust the ratio between the pedal positions. Accordingly, in an embodiment, the configuration and design of the slot(s) in the link member(s) and/or activation link(s) may be designed to allow movement of the adjustable slide pin therein between a first position with a first ratio and a second position with a second ratio. In an embodiment, the modification of the ratio between the first position and the second position of the adjustable pedal assembly may be predetermined. For example, the link member and adjustable slide pin (and/or activation link) may be designed to modify the ratio by a predetermined amount as the pin is moved through the slots of the parts and between pedal positions (e.g., using the illustrative example brake ratios above, from a brake ratio of 4.2:1 in the first position to a brake ratio of 4.75:1 in the second position). Such parts for modifying the ratio between the first and second pedal positions may be designed to be retrofit or added onto existing pedal assemblies.

As such, still yet another aspect of this disclosure provides an adjustable pedal assembly for operating a push rod that activates a functional system of a vehicle. The adjustable pedal assembly is configured for movement between a first position and a second position. The adjustable pedal assembly includes a pedal arm having an elongated lever structure with a first end and a second end; a pedal plate provided on the second end of the elongated lever structure of the pedal arm for depression by a foot of a driver; and a vehicle mounting bracket. The assembly also includes a pivot member configured for pivoting relative to the vehicle mounting bracket about a first fixed pivot axis; an activation link, and a link member. A first end of the activation link is connected to the pivot member for pivoting therewith about the first fixed pivot axis and the second end of the activation link is connected to the elongated lever structure of the pedal. The link member has a first portion pivotally connected at a second fixed pivot axis to the activation link and a second portion connected to a booster receiver for connection to the push rod that activates the functional system of the vehicle. The first end of the elongated lever structure is configured for pivoting with an adjustable slide pin about a third variable pivot axis. The activation link and the link member each have a slot therein for movement of the adjustable slide pin therein. The third variable pivot axis of the adjustable slide pin is configured for adjustment between a first pivot position and a second pivot position in each slot. Movement of the adjustable slide pin between the first pivot position and the second pivot position varies a linear adjustment trajectory of the pedal arm relative to the pivot member in the first position and the second position of the adjustable pedal assembly, and wherein a ratio between a distance between the first fixed pivot axis and the pedal plate and a distance between the first fixed pivot axis and the booster receiver is modified.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. An adjustable pedal assembly for operating a push rod that activates a functional system of a vehicle, the adjustable pedal assembly configured for movement between a first position and a second position, the adjustable pedal assembly comprising:
    a pedal arm comprising an elongated lever structure with a first end and a second end;
    a pedal plate provided on the second end of the elongated lever structure of the pedal arm for depression by a foot of a driver;
    a vehicle mounting bracket;
    a pivot member configured for pivoting relative to the vehicle mounting bracket about a first fixed pivot axis;
    an activation link, a first end of the activation link being connected to the pivot member for pivoting therewith about the first fixed pivot axis and the second end of the activation link being connected to the elongated lever structure of the pedal;
    a link member having a first portion pivotally connected at a second fixed pivot axis to the activation link and a second portion connected to a booster receiver for connection to the push rod that activates the functional system of the vehicle;
    the first end of the elongated lever structure configured for pivoting with an adjustable slide pin about a third variable pivot axis; and
    the activation link and the link member each having a slot therein, the slots each having a correspondingly curved shape axially aligned with each other for receipt of the adjustable pin therethrough such that the adjustable slide pin is configured for movement along and within said slots simultaneously, the third variable pivot axis of the adjustable slide pin configured for adjustment between a first pivot position and a second pivot position in the curved and axially aligned slots,
    wherein movement of the adjustable slide pin between the first pivot position and the second pivot position varies a linear adjustment trajectory of the pedal arm relative to the pivot member in the first position and the second position of the adjustable pedal assembly, while a ratio between a distance between the first fixed pivot axis and the pedal plate and a distance between the first fixed pivot axis and the booster receiver remains substantially constant.

2. The assembly according to claim 1, wherein the adjustable slide pin is configured for placement near a first end of each slot in each of the activation link and the link member in a first position of the adjustable pedal assembly, and wherein the adjustable slide pin is configured for placement near a second end of each slot in each of the activation link and the link member in a second position of the adjustable pedal assembly.

3. The assembly according to claim 1, wherein, in the first position of the adjustable pedal assembly, the activation link pivots with the pivot member, the link member pivots about the second fixed pivot axis and the adjustable slide pin pivots about the third variable pivot axis at the first pivot position, and wherein, in the second position of the adjustable pedal assembly, the activation link pivots with the pivot member, the link member pivots about the second fixed pivot axis and the adjustable slide pin pivots about the third variable pivot axis at the second pivot position.

4. The assembly according to claim 1, wherein the pivot member is a pivot tube.

5. The assembly according to claim 1, wherein the movement of the adjustable slide pin between the first pivot position and the second pivot position varies a position of the pedal plate along a predetermined path between a first position and second position.

6. The assembly according to claim 1, wherein the link member is provided radially outside of the activation link on the second fixed pivot axis when the assembly is viewed in a direction perpendicular to the second fixed pivot axis.

7. The assembly according to claim 1, wherein an angle formed between pedal plate and the booster receiver relative to the pivot member at the first pivot position is different than an angle formed between pedal plate and the booster receiver relative to the pivot member at the second pivot position.

8. The assembly according to claim 1, wherein the slot in the link member is an arcuate slot disposed radially outwardly from the slot of the activation link when the assembly is viewed in a direction perpendicular to the second fixed pivot axis.

9. The assembly according to claim 1, wherein the second pivot position is positioned horizontally below the first pivot position.

10. The assembly according to claim 1, wherein the second fixed pivot axis is positioned horizontally below the first fixed pivot axis.

11. The assembly according to claim 1, wherein the functional system of the vehicle is a brake system or a transmission system.

12. The assembly according to claim 11, wherein the pedal arm is a brake pedal arm for operating a brake booster input element of the vehicle and wherein the link member is constructed to be connected to the push rod of the brake booster input element.

13. The assembly according to claim 1, wherein the activation link comprises a first link and a second link in a parallel configuration, a first end of each of the first and second links of the activation link being connected to the pivot member and a second end of each of the first and second links being connected to each other.

14. The assembly according to claim 1, wherein the link member comprises a first link member and a second link member in a parallel configuration, a first end of each of the first and second link members of the link member being connected to the activation link and a second end of each of the first and second link members being connected to the booster receiver.

15. The assembly according to claim 14, wherein the first link member and the second link member are provided radially outside of the activation link on the second fixed pivot axis when the assembly is viewed in a direction perpendicular to the second fixed pivot axis.

16. A vehicle comprising an adjustable pedal assembly, the adjustable pedal assembly comprising:
 a pedal arm comprising an elongated lever structure with a first end and a second end;
 a pedal plate provided on the second end of the elongated lever structure of the pedal arm for depression by a foot of a driver;
 a vehicle mounting bracket;
 a pivot member configured for pivoting relative to the vehicle mounting bracket about a first fixed pivot axis;
 an activation link, a first end of the activation link being connected to the pivot member for pivoting therewith about the first fixed pivot axis and the second end of the activation link being connected to the elongated lever structure of the pedal;
 a link member having a first portion pivotally connected at a second fixed pivot axis to the activation link and a second portion connected to a booster receiver for connection to the push rod that activates the functional system of the vehicle;
 the first end of the elongated lever structure configured for pivoting with an adjustable slide pin about a third variable pivot axis; and
 the activation link and the link member each having a slot therein, the slots each having a correspondingly curved shape axially aligned with each other and having the adjustable pin positioned therethrough such that the adjustable slide pin is configured for movement along and within said slots simultaneously, the third variable pivot axis of the adjustable slide pin configured for adjustment between a first pivot position and a second pivot position in the curved and axially aligned slots,
 wherein movement of the adjustable slide pin between the first pivot position and the second pivot position varies a linear adjustment trajectory of the pedal arm relative to the pivot member in the first position and the second position of the adjustable pedal assembly, while a ratio between a distance between the first fixed pivot axis and the pedal plate and a distance between the first fixed pivot axis and the booster receiver remains substantially constant.

17. The vehicle according to claim 16, wherein the adjustable slide pin is configured for placement near a first end of each slot in each of the activation link and the link member in a first position of the adjustable pedal assembly, and wherein the adjustable slide pin is configured for placement near a second end of each slot in each of the activation link and the link member in a second position of the adjustable pedal assembly.

18. The vehicle according to claim 16, wherein, in the first position of the adjustable pedal assembly, the activation link pivots with the pivot member, the link member pivots about the second fixed pivot axis and the adjustable slide pin pivots about the third variable pivot axis at the first pivot position, and wherein, in the second position of the adjustable pedal assembly, the activation link pivots with the pivot member, the link member pivots about the second fixed pivot axis and the adjustable slide pin pivots about the third variable pivot axis at the second pivot position.

19. The vehicle according to claim 16, wherein the pivot member is a pivot tube.

20. The vehicle according to claim 16, wherein the movement of the adjustable slide pin between the first pivot position and the second pivot position varies a position of the pedal plate along a predetermined path between a first position and second position.

21. The vehicle according to claim 16, wherein the link member is provided radially outside of the activation link on the second fixed pivot axis when the assembly is viewed in a direction perpendicular to the second fixed pivot axis.

22. The vehicle according to claim 16, wherein an angle formed between pedal plate and the booster receiver relative to the pivot member at the first pivot position is different than an angle formed between pedal plate and the booster receiver relative to the pivot member at the second pivot position.

23. The vehicle according to claim 16, wherein the slot in the link member is an arcuate slot disposed radially outwardly from the slot of the activation link when the assembly is viewed in a direction perpendicular to the second fixed pivot axis.

24. The vehicle according to claim 16, wherein the second pivot position is positioned horizontally below the first pivot position.

25. The vehicle according to claim 16, wherein the second fixed pivot axis is positioned horizontally below the first fixed pivot axis.

26. The vehicle according to claim 16, wherein the functional system of the vehicle is a brake system or a transmission system.

27. The vehicle according to claim 26, wherein the pedal arm is a brake pedal arm for operating a brake booster input element of the vehicle and wherein the link member is constructed to be connected to the push rod of the brake booster input element.

28. The vehicle according to claim 16, wherein the activation link comprises a first link and a second link in a parallel configuration, a first end of each of the first and second links of the activation link being connected to the pivot member and a second end of each of the first and second links being connected to each other.

29. The vehicle according to claim 16, wherein the link member comprises a first link member and a second link member in a parallel configuration, a first end of each of the first and second link members of the link member being connected to the activation link and a second end of each of the first and second link members being connected to the booster receiver.

30. The vehicle according to claim 29, wherein the first link member and the second link member are provided radially outside of the activation link on the second fixed pivot axis when the assembly is viewed in a direction perpendicular to the second fixed pivot axis.

31. A method comprising:
adjusting an adjustable pedal assembly that activates a functional system of a vehicle between a first position and a second position, and
operating a push rod of the adjustable pedal assembly in its position to active the functional system of a vehicle, wherein the adjustable pedal assembly comprises:
a pedal arm comprising an elongated lever structure with a first end and a second end;
a pedal plate provided on the second end of the elongated lever structure of the pedal arm for depression by a foot of a driver;
a vehicle mounting bracket;
a pivot member configured for pivoting relative to the vehicle mounting bracket about a first fixed pivot axis;
an activation link, a first end of the activation link being connected to the pivot member for pivoting therewith about the first fixed pivot axis and the second end of the activation link being connected to the elongated lever structure of the pedal;
a link member having a first portion pivotally connected at a second fixed pivot axis to the activation link and a second portion connected to a booster receiver for connection to the push rod that activates the functional system of the vehicle;
the first end of the elongated lever structure configured for pivoting with an adjustable slide pin about a third variable pivot axis; and
the activation link and the link member each having a slot therein, the slots each having a correspondingly curved shape axially aligned with each other, and having the adjustable pin positioned therethrough such that the adjustable slide pin is configured for movement along and within said slots simultaneously, the third variable pivot axis of the adjustable slide pin configured for adjustment between a first pivot position and a second pivot position in the curved and axially aligned slots,
wherein movement of the adjustable slide pin between the first pivot position and the second pivot position varies a linear adjustment trajectory of the pedal arm relative to the pivot member in the first position and the second position of the adjustable pedal assembly, while a ratio between a distance between the first fixed pivot axis and the pedal plate and a distance between the first fixed pivot axis and the booster receiver remains substantially constant.

32. The method according to claim 31, wherein the adjustable slide pin is configured for placement near a first end of each slot in each of the activation link and the link member in a first position of the adjustable pedal assembly, and wherein the adjustable slide pin is configured for placement near a second end of each slot in each of the activation link and the link member in a second position of the adjustable pedal assembly, and wherein the adjusting of the adjustable pedal assembly between the first position and the second position comprises moving the adjustable slide pin simultaneously between near the first end of each slot in the activation link and the link member in the first position of the adjustable pedal assembly and near the second end of each slot in the activation link and the link member in the second position of the adjustable pedal assembly.

33. The method according to claim 31, wherein the movement of the adjustable slide pin between the first pivot position and the second pivot position during the adjusting comprises varying a position of the pedal plate along a predetermined path between a first position and second position.

34. The method according to claim 31, wherein the link member is provided radially outside of the activation link on the second fixed pivot axis when the assembly is viewed in a direction perpendicular to the second fixed pivot axis.

35. The method according to claim 31, wherein an angle formed between pedal plate and the booster receiver relative to the pivot member at the first pivot position is different than an angle formed between pedal plate and the booster receiver relative to the pivot member at the second pivot position, and wherein the adjusting of the adjustable pedal assembly between the first position and the second position comprises changing the angles.

36. The method according to claim 31, wherein the functional system of the vehicle is a brake system or a transmission system.

37. The method according to claim 36, wherein the pedal arm is a brake pedal arm for operating a brake booster input element of the vehicle and wherein the link member is constructed to be connected to the push rod of the brake booster input element.

38. The method according to claim 31, wherein the activation link comprises a first link and a second link in a parallel configuration, a first end of each of the first and second links of the activation link being connected to the pivot member and a second end of each of the first and second links being connected to each other.

39. The method according to claim 31, wherein the link member comprises a first link member and a second link member in a parallel configuration, a first end of each of the first and second link members of the link member being connected to the activation link and a second end of each of the first and second link members being connected to the booster receiver.

* * * * *